United States Patent

[11] 3,526,193

| [72] | Inventor | James Vani |
| | | 3930 Oak St., Fairfax, Virginia 22030 |
| [21] | Appl. No. | 793,027 |
| [22] | Filed | Jan. 22, 1969 |
| [45] | Patented | Sept. 1, 1970 |

[54] VEHICLE MOVING CONVEYOR APPARATUS
9 Claims, 11 Drawing Figs.

[52] U.S. Cl. .................................................. 104/173,
104/247
[51] Int. Cl. ...................................................... B65g 39/20,
B65g 23/04
[50] Field of Search .......................................... 104/172,
176, 245, 246, 247; 198/171

[56] References Cited
UNITED STATES PATENTS
1,232,051  7/1917  Kuhn ............................ 198/171

| 3,370,548 | 2/1968 | Rickel ......................... | 104/172 |
| 3,408,951 | 11/1968 | Heinicke et al. ............. | 104/172 |
| 3,474,739 | 10/1969 | Van Brakel ................... | 104/172 |

*Primary Examiner* — Arthur L. La Point
*Assistant Examiner* — Robert Saifer
*Attorney* — Gustave Miller

ABSTRACT: This is an apparatus for moving a vehicle, such as an automobile or car, through an automobile washing station or a car assembly line, a vehicular tunnel, or any place that a series of cars have to be moved without using the car engines, the apparatus comprising a power driven endless chain having laterally projecting axles carrying tire periphery engaging pusher rollers and, spaced forwardly of each pusher wheel, a side thrust compensator journaled on an axle supported on the chain preventing the pushed tire from gashing itself on a guide rail and particularly, in the case of a soft side wall tire such as a radial tire, preventing the wheel from climbing up a guide rail and out of the proper path.

Patented Sept. 1, 1970

INVENTOR
James Vani
BY Gustave Miller
ATTORNEY

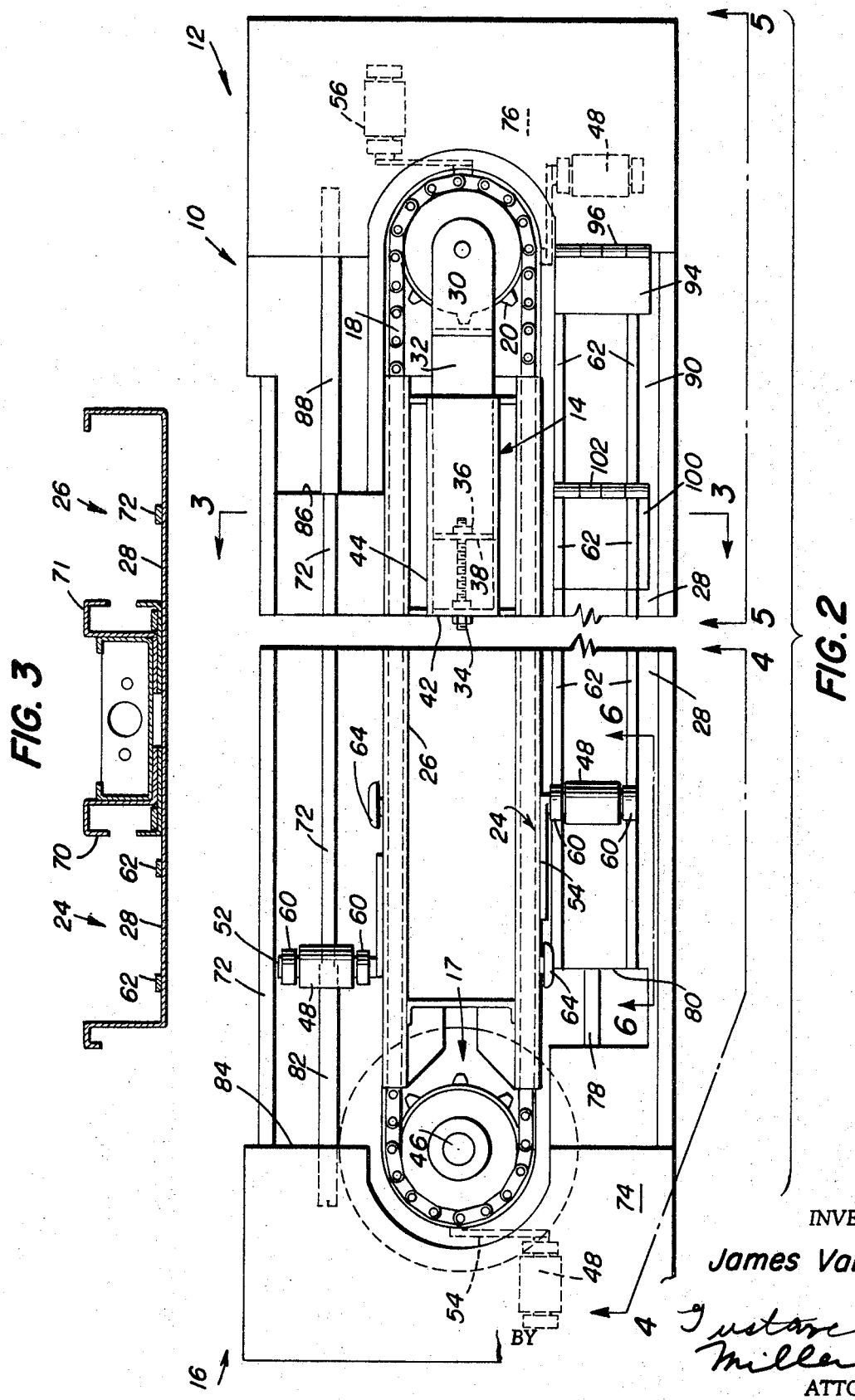

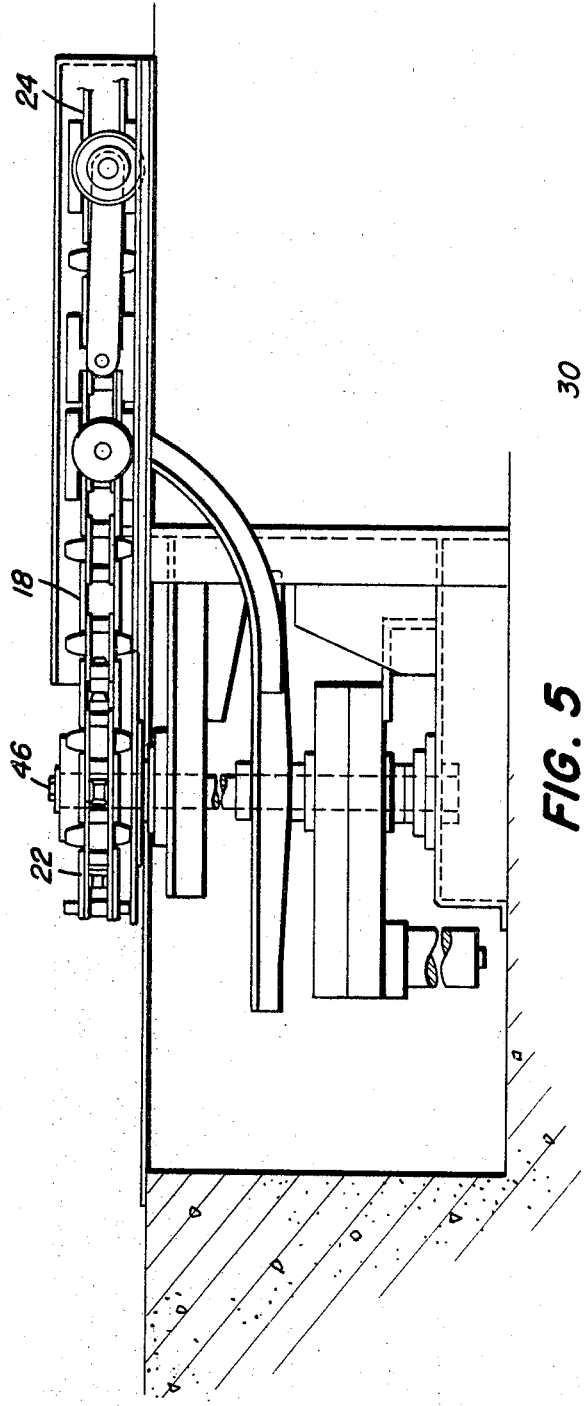
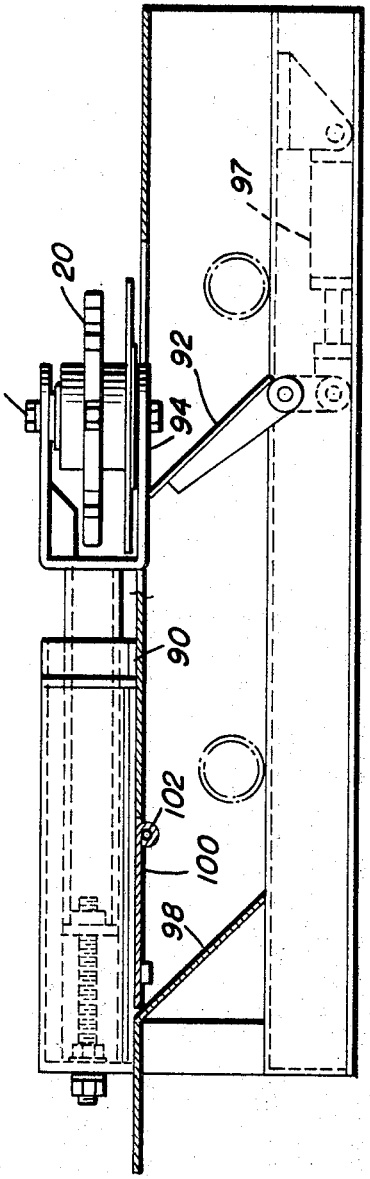
FIG. 4
FIG. 5
INVENTOR
James Vani
BY Gustave Miller
ATTORNEY

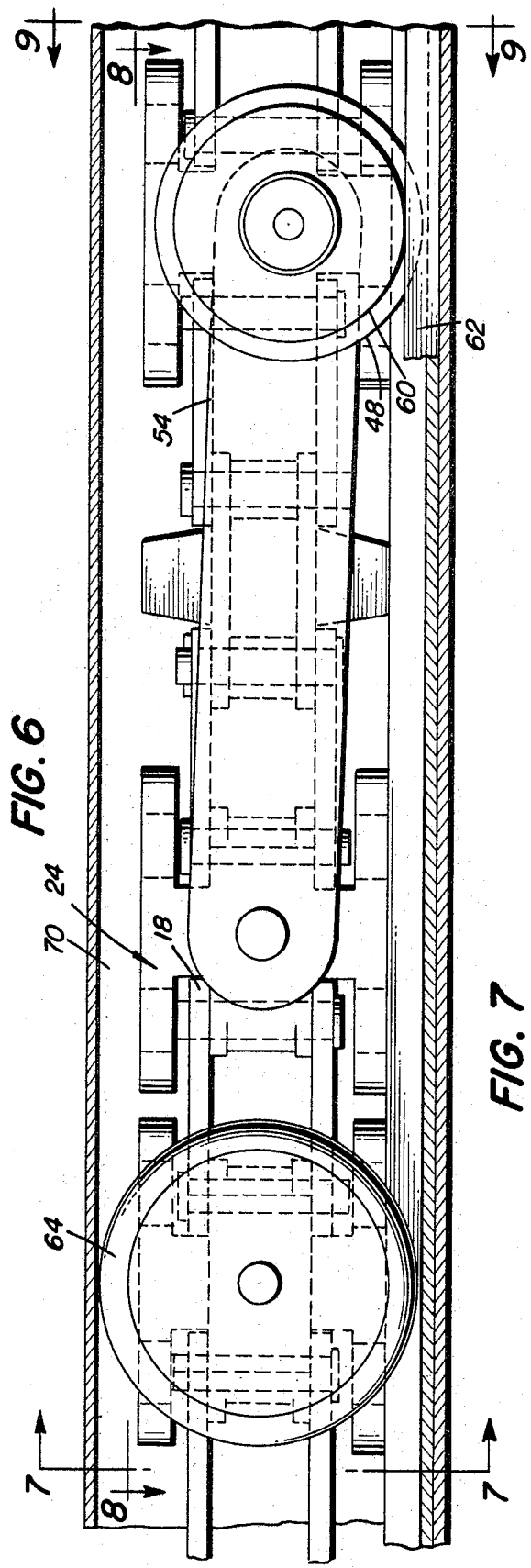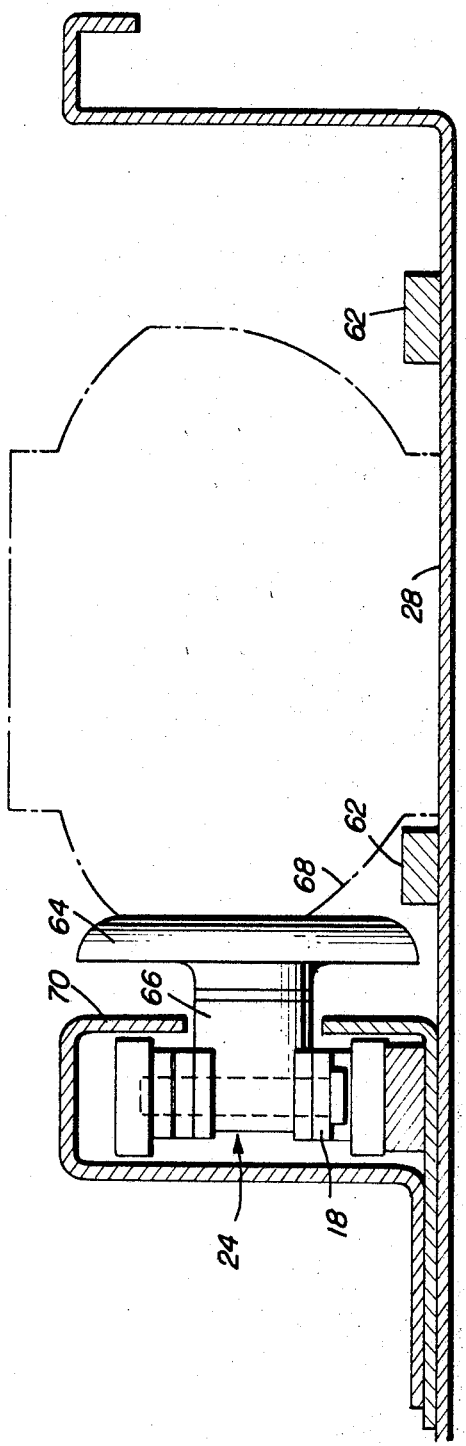

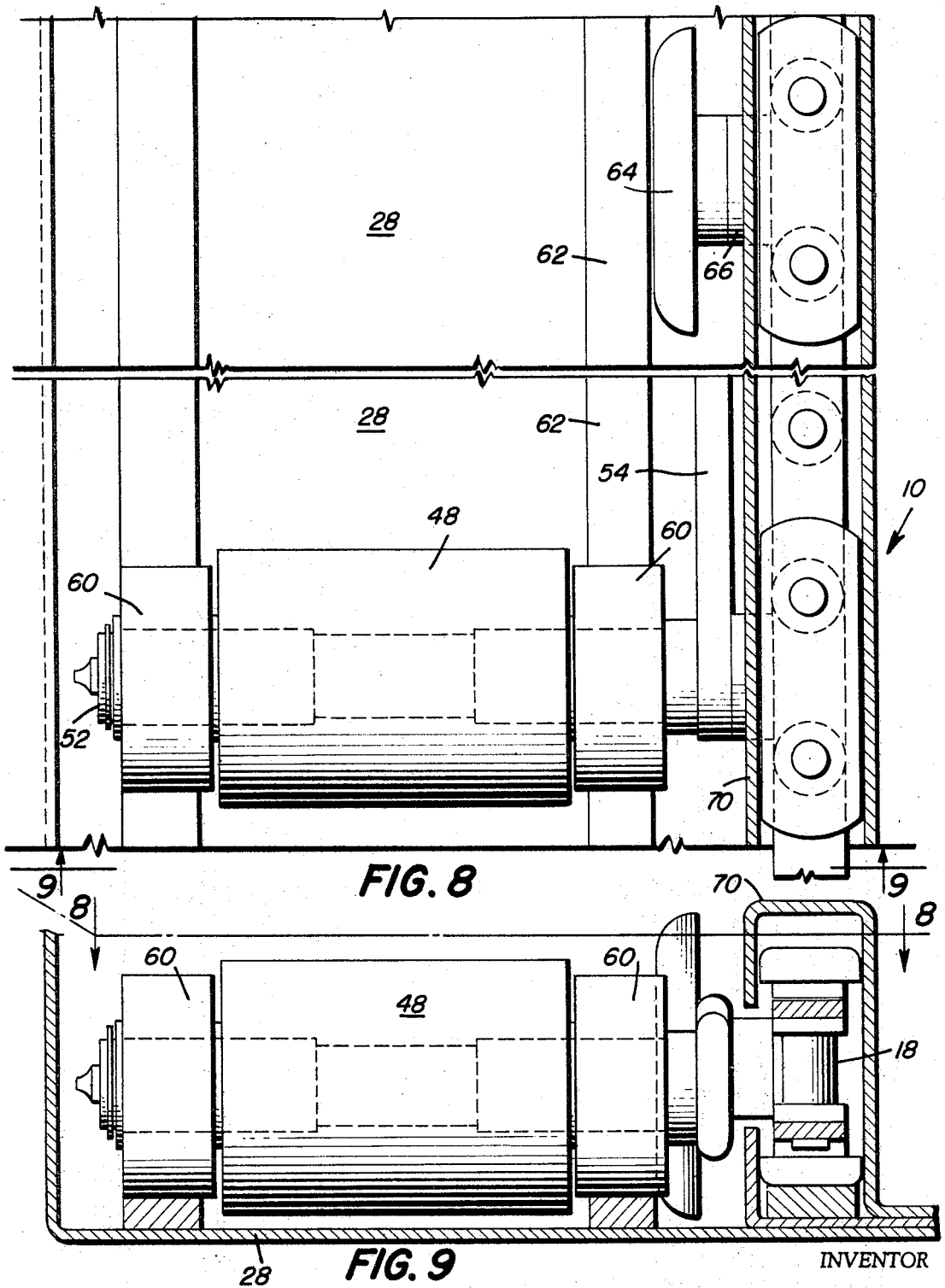

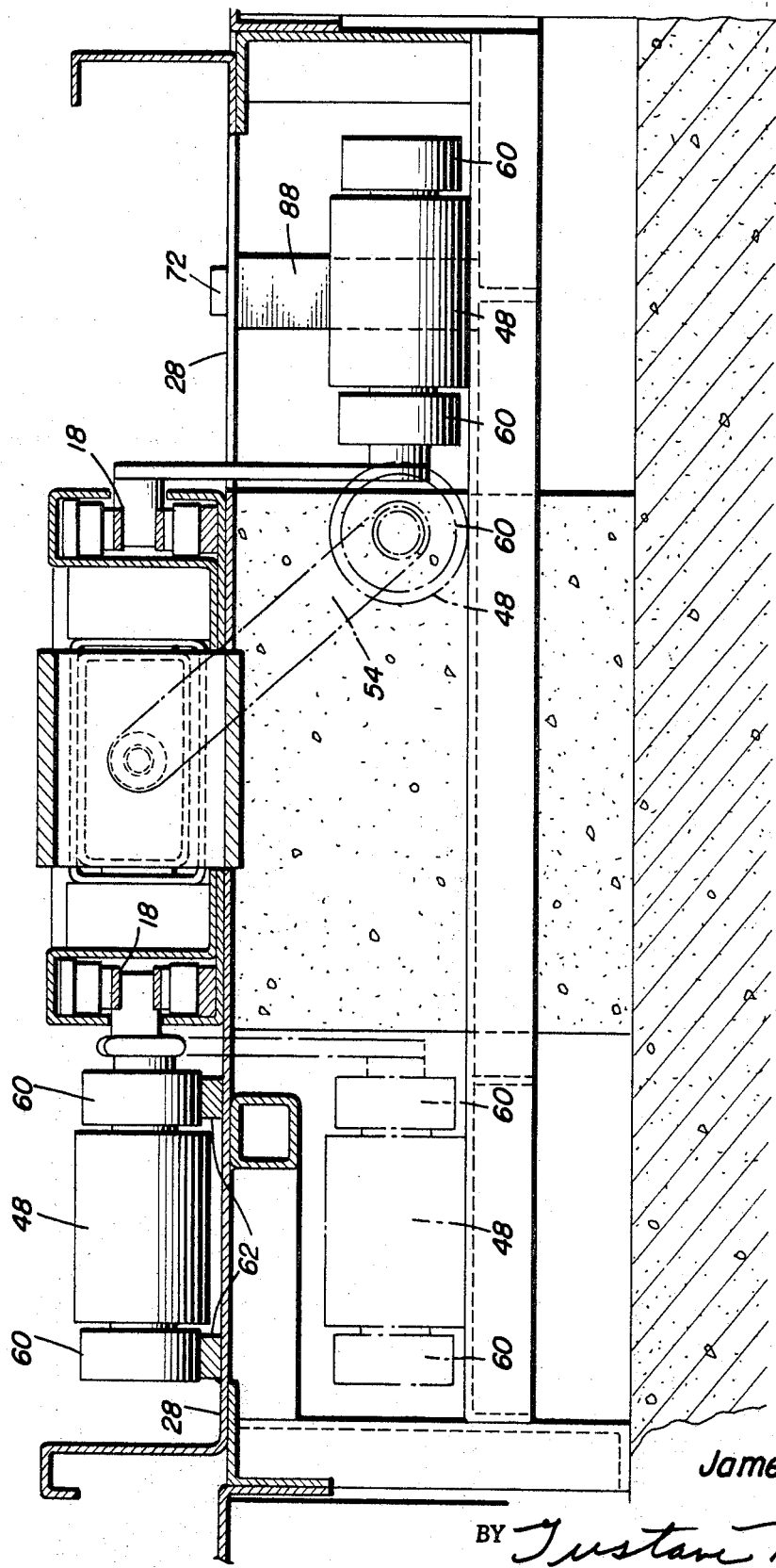

3,526,193

VEHICLE MOVING CONVEYOR APPARATUS

BACKGROUND OF THE INVENTION

While conventional car washing stations or other car moving apparatuses use a detachable hook connecting the car bumper to a chain for moving a car through the car moving apparatus, with the danger of damage to the car, improvements thereover, such as applicant's prior U.S. Pat. No. 3,260,219 of July 12, 1966, disclose a conveyor which pushes a roller against the tire wheel to move the car through the wash station. Such prior conveyor devices include a guide rail for guiding the wheel, but such has the disadvantage that the tire can gash itself on the guide rail, and in the case of a soft side wall tire, such as a radial tire, the auto wheel tire may climb the guide rail.

OBJECTS OF THE INVENTION

It is an object of this invention to provide a wheeled vehicle conveyor wherein the vehicle is pushed by a roller pushing against one of the vehicle or car wheels, yet wherein there is no possibility of the tire gashing itself on the guide rail or of climbing the guide rail and thus failing to track properly.

A further object of this invention is to provide a side thrust compensator for the wheel being pushed that will prevent the pushed steerable wheel from gashing itself on the guide rail and will prevent it from climbing the guide rail.

A still further object of this invention is to provide a rotatable side thrust compensator which will contact the wheel, forwardly of where it is being pushed, which will be rotated by the wheel being pushed to minimize the friction therebetween, and will insure that the wheel will track properly along the conveyor.

Still a further object of this invention is to provide a car conveyor which, while being particularly intended for vehicle washing stations, is also suitable for any car conveyor purpose, including a car or assembly line or other wheeled vehicles anywhere, or in vehicular tunnels or elsewhere wherever a series of cars must be moved from time to time without using the car engines.

Still a further object of this invention is to provide an improved car wheel pusher and conveyor system, wherein the pusher is a rotatable roller which pushes against the rear lower portion of one of the steerable or rear wheels of the vehicle being pushed, and to provide wheels journaled at the ends of the roller axle and cooperating with tracks on the floor over which the wheel is being pushed for maintaining the pushing roller out of floor contact so that it may rotate freely in the direction opposite to the rotation of the car wheel being pushed, yet which, if the car is prevented from being pushed, as by having the rear wheel brakes locked, or the car being left in gear or with the gear in parked position, the pusher roller will merely harmlessly lift up and roll under the car wheel it should be pushing, preventing any damage to the car.

Still a further object of this invention is to provide a pusher roller which is secured to the conveyor chain by a pivoted link, and wherein the conveyor chain has its return pass stay on the floor level, passing under the vehicle between the opposite side vehicle wheels, eliminating the need for a long trench for the return pass, and wherein the pusher roller, at the end of its link, descends on a ramp through a trap door opening into a pit for moving from one pass to the other, and ascends on a ramp to the beginning of each pass, thus providing straight line contact on engaging and disengaging the wheel being pushed.

Still a further object of this invention is to provide a modification of the ramp at the beginning of the pushing pass of the conveyor by providing a controllable ramp before the wheel engaging or car pick up station at the beginning of the pass, and a second ramp located just beyond the car pick up station so that the car may be left at the car pick up station temporarily, as desired, with the pusher roller bypassing the car at the car station until the controllable ramp is actuated into active position to cause the pusher roller to ascend and engage the car wheel at the car station for moving the car along the conveyor.

SUMMARY OF THE INVENTION

This invention is a vehicle conveyor for use in moving a wheeled vehicle through a car wash station, or a car assembly line, a vehicular tunnel or anywhere else that it may be desirable to move a steerable wheeled vehicle which is neither self powered nor manually steered while so being moved from one point to a second point. It includes a powered conveyor chain extending between a power gear and a take-up gear to provide a powered conveying pass and an idle return pass, the conveyor chain remaining above ground level, with a novel side thrust compensator journaled on an axle secured on the chain, and a pusher roller journaled on a link pivoted on the chain, the pusher roller descending from its pushing position, at the end of the pushing pass, through a trapdoor opening on a ramp to travel about the end gear and then ascend for its return pass on floor level then descend on another ramp for travel about the second gear and ascend into pushing position behind a car steerable wheel which has meantime been placed in a car station position ahead of where the pusher roller ascends to the pushing position. In a modification, the ascending ramp behind the car station may be made controllable at the will of an operator to pivot away from operative position, bypassing the car station, and then the pusher roller may ascend a fixed ramp located beyond the car station, as when it may be desired to have the car further spaced along the conveyor chain before it is moved along the conveyor.

BRIEF DESCRIPTION OF THE FIGURES

With the above and related objects in view, this invention consists in the details of construction and combination of parts, as will be more fully understood from the following description, when read in conjunction with the accompanying drawing, in which:

FIG. 2 is a top plan view of FIG. 1, partly diagrammatic, showing the drive and take-up mechanism on a large scale, omitting the central repetitive portion of the conveyor apparatus;

FIG. 3 is a cross sectional view on line 3—3 of FIG. 2 through the take-up end of the conveyor apparatus;

FIGS. 4 and 5 are side elevational views on lines 4—4 and 5—5 of FIG. 3, of the drive and the take-up mechanisms on a larger scale;

FIG. 6 is a side elevational view, on a still larger scale, of the side thrust compensator and the pusher roller partly broken away, on line 6—6 of FIG. 2;

FIG. 7 is a sectional view on line 7—7 of FIG. 6, showing an end elevation of the thrust compensator cooperating with a pushed wheel;

FIG. 8 is a top plan view, on line 8—8 of FIGS. 6 and 9, showing the pusher roller and side thrust compensator details partly in section and partly broken away;

FIG. 9 is an elevational view on line 9—9 of FIGS. 6 and 8, partly in section;

FIG. 11 is a sectional view, on a still larger scale, approximately on line 11—11 of FIG. 10.

DETAILED DESCRIPTION OF THE INVENTION

Figure 1:
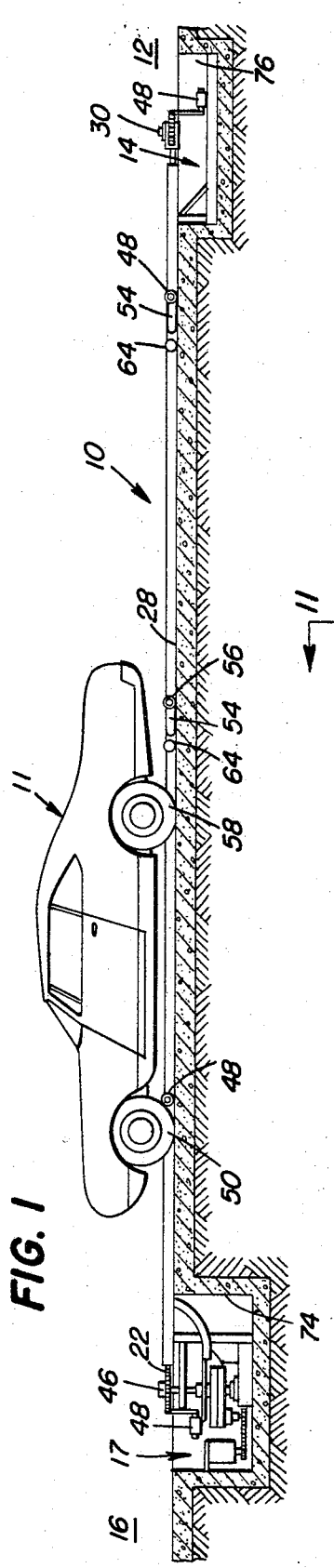
FIG. 1 is a side elevational view, partly in section, of the vehicle moving conveyor apparatus of this invention.
Figure 10:
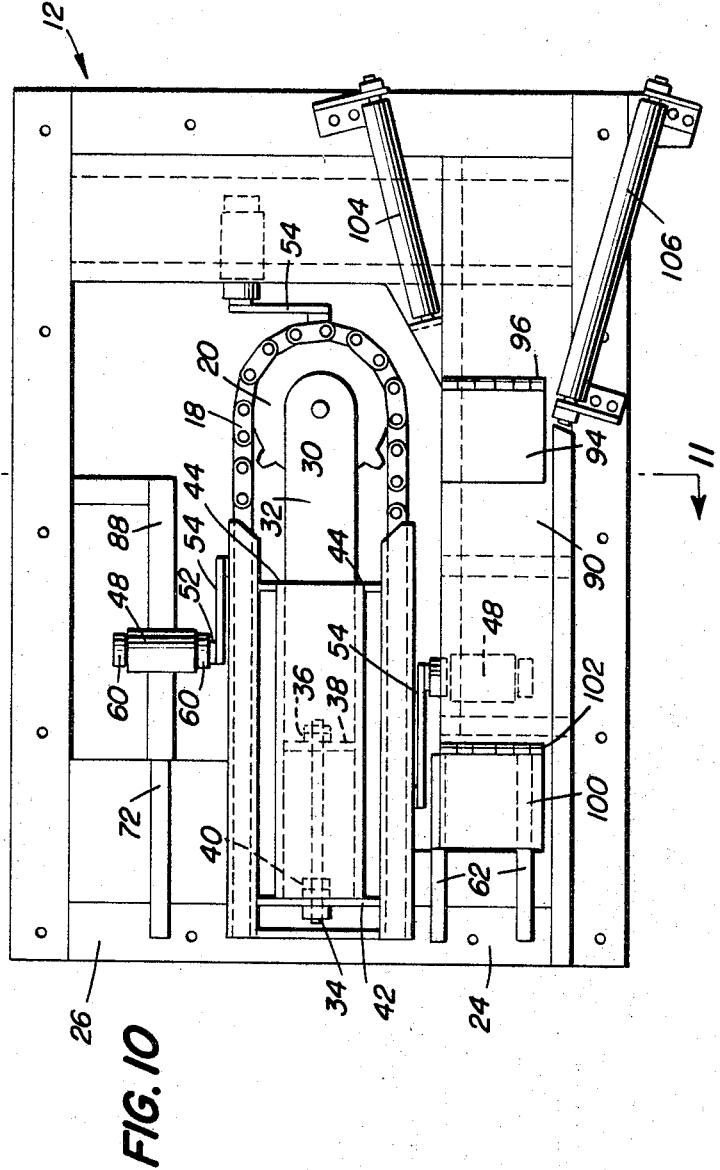
FIG. 10 is a more detailed top plan view than in FIG. 2 of the take-up end of the conveyor apparatus, partly diagrammatic.

There is shown at 10 the wheeled vehicle moving conveyor apparatus of this invention. With this invention 10, a wheeled vehicle, such as an automobile or car 11, may be moved along from an entrance end 12 where a conveyor chain take-up mechanism 14 is located, to the discharge end 16, where the chain power drive mechanism 17 is located, a chain 18 travelling about a gear 20 of the take-up mechanism 14 to around a similar gear 22 of the power mechanism 17. As will be apparent, the chain 18 travels from take-up mechanism 14 in a power pass 24 to the power mechanism 17 and then returns in an idle or no power pass 26 back to the take-up mechanism 14, remaining at all times in a horizontal plane above the level of the floor 28. While this conveyor is intended for use in a car wash station, it may equally be used anywhere it is desired to move a car, without its own power and without any one operating the car steering wheel, from an entrance end 12 to a discharge end 16, such as in a car manufacturing or car assembly line. It may likewise be used for moving cars, with drive and passengers in them, in a long vehicular tunnel on a highway, with the motor shut off and with the driver keeping his hands off the wheel, at an optimum speed and with a much smaller ventilation problem than when the motors of the cars are operated for providing the power. For very long tunnels, a plurality of conveyors, end to end, may be used to cut down the power needed at each conveyor, and by properly synchronizing the various conveyors, cars could go through a long tunnel at a greater number per hour than is now possible using the cars' motors in view of the lesser ventilation that would be needed. In fact, by using one way tunnels, the cars themselves may draw enough air through the tunnel to eliminate or minimize the need for any other ventilation.

Any suitable or convenient conventional power supply may be used for operating the power gear, whether electric, hydraulic or steam or otherwise. The slack in the chain 18 is maintained at the optimum by means of its vertical axis shaft 30 journaled in a U-shaped bracket 32 which is adjustably positioned by a bolt 34 threaded through a nut 36 welded to the bight 38 of the bracket 32, the bolt 34 being locked in adjusted position by a lock nut 40 and a stanchion 42, the bracket 32 being adjustable between track plates 44. The power gear shaft 46 is likewise on a vertical axis suitably powered as above set forth.

The car 11 is pushed along the floor 28 by having a pusher roller 48 push the lower rear portion of the car front wheel 50, the car tire 68 being considered broadly as part of the wheel 50. The pusher roller 48 is journaled on an axle 52 fixed on the end of a link 54 whose other end is pivotally fixed in the chain 18 at fixed intervals of about six feet, which is greater than the length of the longest car wheel base so that the succeeding roller 56 will follow behind the car back wheel 58.

In the power pass 24, the pusher rollers 48 and 56 are maintained above the level of the floor 28 by means of roller axle wheels 60 riding on spaced glides or tracks 62 on the floor 28, so that the pusher rollers may rotate against the bottom of the tire 68 of the wheel 50. However, should the car 11 be unable to move, due to the gear being left in park position, or the brakes being left locked on the rear wheels 58, as sometimes occurs with careless drivers, the pusher roller 48 will merely lift up the front car wheel 50 and pass thereunder, and then the next pusher roller 56 will do likewise under the rear and front wheels until the brake is released or the gear moved from park position, permitting the car to advance.

An important and novel feature of this apparatus 10 is the side thrust compensator consisting of a smooth faced wheel 64 journaled on a shaft 66 secured in the chain 18 at a suitable distance forward of each pusher roller 48 so that the side periphery of the car wheel 50, or rather of its tire 68, will ride thereagainst. The side thrust compensator rotating wheel 64 will take up the side thrust of the steerable car wheel 50 and prevent the tire 68 of car wheel 50 from moving into contact with and gashing itself against the channel 70 through which the power pass 24 of the chain 18 travels, to then return through channel 71 of pass 26. Obviously, the side thrust compensator wheel 64 may rotate in either direction, depending on the diameter of the tire 68 and wheel 50. A further advantage of this side thrust compensator wheel 64 is that it will guide a soft side wall tire successfully, which, if not present, would have to guide itself against the channel 70 acting as a guide wall.

Such guide walls, conventional with prior pusher rollers, may operate with a hard side wall tire, which will ride thereagainst possibly gashing itself but in any case, causing undue wear on the tire side wall and thus being unsuitable for any long guide wall, as in a vehicular tunnel, for instance. However, a guide wall is impractical with a soft side wall tire, such as a radial tire, as now coming into use, because such a tire cannot be guided by a guide wall, it will merely climb up over the guide wall in the same manner as it now does when moved against a curb even at a very slight angle. Hence, it is this side thrust compensator wheel 64 that makes it possible to use a pusher roller with any type of tire, for any type of car conveyor for any length. In the no-power pass 26, the pusher roller 48 will ride on a track 72 thereunder on the floor 28, and the chain 18 travels through channel 71.

While the chain 18 moves in a single plane above the floor 28 in both passes 24 and 26 between the gears 20 and 22, and the pusher rollers 48 and 56 travel in one and the same plane in both passes 24 and 26, it is not desirable that the pusher rollers 48 and 56 remain in these passes plane while circling about the axle shafts 30 and 46 because if it did, it would draw sidewise across the face of the tire 68 and possibly damage it. It is to avoid this possibility of damage that the pusher roller is journaled on the link 54 to the chain 18, for a pit 74 is provided at the discharge end for the power mechanism 17 at the car discharge end 16, and another pit 76 is provided for the take-up mechanism 14, both mechanisms being below the level of the floor 28. These same pits 74 and 76 also serve for rotating the pusher rollers 48 and 56 about the gear shafts 30 and 46 below the level of the floor 28 by having the rollers 48 and 56 then descend a ramp 78 into the power pit 74 through a trapdoor opening 80 which the tire 68 will pass over imperceptably, then travel around the power gear 22, at the end of the downwardly pivoted link 54, then ascend up a ramp 82 through another larger trapdoor opening 84 to the no-power or return pass 26, which return or no-power pass 26 is located under the car 11 as it is moving along the conveyor apparatus 10.

Then at the rear entrance end 12, another trapdoor opening 86 has a ramp 88 leading down into the take-up mechanism pit 76 for rotating the rollers 48 and 56 about the take-up gear shaft 30 and bring them under the beginning of the power pass 24.

After rotating about the take-up gear shaft 30, the rollers 48 and 56 are brought up a ramp to push the next car wheel 50 brought to a car pick up station 90 just forward of a trap door opening 94 through which the rollers 48 and 56 may return to the power pass 24.

In FIG. 5, a controllable ascend ramp 92 is shown leading up through the opening having a liftable trapdoor 94 pivoted on hinge 96. A controllable powered cylinder 97 controlled in any suitable manner for controlled operation by an attendant, will lift the ramp 92 to operative position when it is desired to let the next car 11 enter for movement by the apparatus 10. If the attendant does not want the car to move as yet, he lets the ramp 92 remain in down position, in which case the rollers 48 will bypass the car pick up station 90 and instead move up the fixed ascend ramp 98, lift and open the trapdoor 100, pivoted on hinge 102, and then travel along pass 24 on tracks or glides 62 without contact with the front wheel tires 58 of the car on pick up station 90. To move the car in the pick up station 90, the attendant lifts the ramp 92, causing the roller 48 to ascend, lift the trapdoor 94 and move the car on pick up station 90.

This controllable ramp 92 would be useful, although not necessary, in a car washing system. It may be completely omitted, however, particularly in a vehicular tunnel, for instance, with a series of conveyor apparatuses 10. In such case, the controllable ascend ramp 92 and its mechanisms is omitted, and the fixed ramp 98 is placed ahead of car pick up station 90 at the location of the controllable ramp 92, and the car 11, guided by the V placed rollers 104 and 106 will go to the pick up station 90, will then automatically be moved by the next pusher roller 48 coming up the ramp. This would be necessary in a vehicular tunnel operation, and is just as useful in a car wash system. An attendant would keep the cars from entering the power pass 24 until the previous car is spaced far enough ahead in the car wash apparatus.

SUMMARY OF OPERATION

In operation, the car 11 will drive in at the entrance end 12 when so directed by the attendant, and the V placed guide rollers 104 and 106 will place his left front wheel 50 and front tire 68 thereon over the car pick up station 90, then stop his car 11 and cut off the car motor and leave his gear in neutral position with the parking brake also released. He need not leave the car, if it is water tight, and he may ride it through the car washing apparatus, along with his passengers. In such case, the attendant may hand the driver a damp towel for him to clean the inside of the windows and the reachable car parts while the car is travelling through the car washing apparatus. As the car is picked up by the pusher roller 48, the tire 68 will have its side wall come into contact with the adjacent side thrust compensator wheel 64 to guide the car 11 along the power pass 24 with a minimum of tire side wall friction even though the tire may be a soft side wall tire such as a radial tire which could not follow a guide wall without climbing over the guide wall.

In the case of a vehicular tunnel, only the fixed ramp 98 would be used, and the rollers 48 would pass over the car pick up station 90 to pick up the car.

When the roller 48 descends the front ramp 78 from behind the front wheel 50, the following roller 56 will then come along behind the back wheel 58 and advance the car 11 until it is at the front end of pass 24, whereupon the driver in the car may then start his motor and drive on.

In the case of a vehicular tunnel, only the fixed ramp 98 would be used and the rollers 48 would be spaced apart the minimum distance that one car may follow the car ahead, and they would be travelling at a greater speed than in a car wash apparatus. The momentum of the car, at the higher speed would move the car onto a succeeding conveyor apparatus and be picked up and move continuously from conveyor to conveyor with the car motor in off position, avoiding any contamination of the tunnel atmosphere, minimizing the ventilation problem.

In the drawings, like numbers refer to like parts, and for the purposes of explication, set forth below are the numbered parts of the improved Vehicle Moving Conveyor Apparatus:

10 wheeled vehicle moving conveyor apparatus
11 car or automobile vehicle
12 car entrance end
14 conveyor chain take-up mechanism
16 car discharge end
17 power mechanism
18 conveyor chain
20 take-up chain gear
22 power chain gear
24 power pass
26 no-power or return pass
28 floor
30 vertical axis shaft of take-up gear 20
32 U-shaped bracket for journaling shaft 30
34 adjusting bolt for 32
36 nut welded on bight 38
38 bight of bracket 32
40 lock nut on bolt 34
42 stanchion
44 track plates for 32
46 vertical axis shaft of power gear 22
48 pusher roller
50 front car wheel
52 axle for roller 48
54 link from 52 to chain 18
56 following pusher roller
58 car rear wheel
60 roller axle supporting wheels on tracks 62 in pass 24
62 tracks or glides on 28 for pusher roller wheels 60
64 side thrust compensator wheel
66 shaft for compensator wheel 64
68 car wheel tire
70 chain channel for pass 24
71 chain channel for pass 26
72 roller track in return or no-power pass 26
74 power pit
76 take-up pit
78 descend ramp to pit 74
80 trapdoor opening to descend ramp 78
82 ascend ramp to 84
84 trapdoor opening from power pit 74
86 trapdoor opening to descend ramp 88 to pit 76
88 descend ramp to pit 76
90 car pick up station
92 controlled ascend ramp
94 trapdoor for 92
96 hinge of trapdoor 94
97 ramp cylinder
98 fixed ascend ramp from pit 76
100 trapdoor for 98
102 hinge of 100
104 one V placed roller guide to pick up station 90
106 other V placed roller guide to pick up station 90.

Although this invention has been described in considerable detail, such description is intended as being illustrative rather than limiting, since the invention may be variously embodied.

I claim:

1. An apparatus 10 for so moving a wheeled vehicle 11 across a floor 28 that during said movement the wheels 50, 58 on one side of said vehicle 11 move in one direction along a predetermined path of travel, and the wheels on the other side of said vehicle 11 move in said one direction along another and parallel path of travel, said apparatus 10 comprising rotatable pusher means 48 for abuttingly engaging the periphery 68 of one of said wheels 50 on said one side of said vehicle 11, means including a conveyor chain 18 for driving said rotatable wheel pusher means 48 along said path of travel in a vehicle moving operation, said conveyor chain 18 having two horizontally spaced passes 24 and 26 between said paths of travel, one pass 24 being adjacent to said one path of travel for moving said pusher means 48 in said one direction, and the other said path being on the side of said one pass 24 remote from said one path of travel for moving said pusher means 48 in the direction opposite to said one direction in a return movement to said path of travel for another movement in said one movement, and a side thrust compensator 64, means securing said compensator 64 on said chain 18 forwardly of said rotatable pusher means 48 for being abutted by the side of said periphery 68 abutted wheel 50 on the side of said one pass adjacent said other pass, said side thrust compensator including a disc, said compensator securing means comprising a shaft secured on said chain.

2. The apparatus of claim 1, said compensator being a disc 64 journaled on said shaft 66 for being rotated thereon by the side 68 of the abutting wheel 50.

3. The apparatus of claim 1, means for securing said pusher means 48 to said chain 18 comprising a rearwardly extending link 54 pivotally secured to said chain 18, and an axle 52 secured on said link 54, said rotatable pusher means 48 being journaled on said axle 52.

4. The apparatus of claim 3, said rotatable pusher means comprising a vehicle wheel periphery engaging roller 48 journaled on said axle 52, and additional wheel means 58 journaled on said axle 52, and track means 62 on said floor 28 engageable by said additional wheel means 58 supporting said rotatable pusher roller 48 above and out of contact with said floor 28 during the vehicle moving operation.

5. The apparatus of claim 3, and chain moving means 22, 46 at one end of said passes 24, 26, chain take-up means 20, 30, 32 at the other end of said passes 24, 26, a trapdoor floor opening 80, 84, 86, 94 adjacent each end of each pass 24, 46, a ramp 78, 82, 88, 92 at each trapdoor opening leading to and from a lower level semi-circular path for said pusher 48 below 74, 76 the floor 28 about said chain moving means 17 and said chain take-up means 20, 30, 32.

6. The apparatus of claim 5, said side thrust compensator including a disc 64, said compensator securing means comprising a shaft 66 secured on said chain 18, said compensator disc 64 continuing on said chain 18 at floor 28 level about said chain moving means 22 and said chain take-up means 20, said rotatable pusher roller 48 disengaging the vehicle wheel 50 periphery 68 at the forward end 16 of said vehicle wheel pushing pass by descending down the end trapdoor opening 80 and ramp 78, said rotatable pusher roller 48 ascending up the ramp 92 and through the trapdoor 94 at the rearward end of said vehicle wheel pushing pass 24 to engage a vehicle wheel periphery 68 in a position 90 forward of said rear trapdoor.

7. The apparatus of claim 5, said chain moving and take-up means each including a gear 20, 22 meshed with said chain 18 at each end of said passes 24, 26, a vertical shaft 30, 46 for each gear 20, 22, a power mechanism 17 for said chain moving means, and adjustable journal means 32 for said take-up gear 30.

8. The apparatus of claim 5, and vehicle wheel V positioned guide rollers 104, 106 on opposite sides of said vehicle moving pass located rearwardly of said pusher roller ascending ramp 92 and trapdoor opening 94 for guiding the vehicle toward a pusher roller 48 engaging station 90 just forwardly of said trapdoor 94.

9. The apparatus of claim 8, means 97 for controllably depressing said pusher roller 48 ascending ramp 92, and a second but fixed ascending ramp 98 and trapdoor 100 opening forward of said wheel engaging station 90 for bypassing said wheel engaging station 90 at will.